US008908267B2

(12) United States Patent
McCarthy et al.

(10) Patent No.: US 8,908,267 B2
(45) Date of Patent: Dec. 9, 2014

(54) LOW-EMISSIVITY WINDOW FILMS AND COATINGS INCORPORATING NANOSCALE WIRE GRIDS

(75) Inventors: Wil McCarthy, Lakewood, CO (US); Paul Ciszek, Denver, CO (US); Richard M. Powers, Lakewood, CO (US)

(73) Assignee: Ravenbrick, LLC, Denver, CO (US)

( * ) Notice: Subject to any disclaimer, the term of this patent is extended or adjusted under 35 U.S.C. 154(b) by 1485 days.

(21) Appl. No.: 12/234,383

(22) Filed: Sep. 19, 2008

(65) Prior Publication Data
US 2009/0128893 A1 May 21, 2009

Related U.S. Application Data (60) Provisional application No. 60/994,370, filed on Sep. 19, 2007.

(51) Int. Cl.
*G02B 5/30* (2006.01)
*G02B 5/18* (2006.01)
*G02B 5/20* (2006.01)

(52) U.S. Cl.
CPC .............. *G02B 5/1866* (2013.01); *G02B 5/208* (2013.01); *G02B 5/3058* (2013.01); *G02B 5/1861* (2013.01)
USPC ...... 359/352; 359/350; 359/485.05; 359/614; 359/566

(58) Field of Classification Search
None
See application file for complete search history.

(56) References Cited

U.S. PATENT DOCUMENTS

| 3,990,784 | A | | 11/1976 | Gelber |
| 4,006,730 | A | * | 2/1977 | Clapham et al. .............. 126/648 |
| 4,155,895 | A | | 5/1979 | Rohowetz et al. |
| 4,268,126 | A | | 5/1981 | Mumford |
| 4,456,335 | A | | 6/1984 | Mumford |
| 4,475,031 | A | | 10/1984 | Mockovciak, Jr. |
| 4,491,390 | A | | 1/1985 | Tong-Shen |
| 4,512,638 | A | | 4/1985 | Sriram et al. |
| 4,579,638 | A | | 4/1986 | Scherber |
| 4,640,583 | A | | 2/1987 | Hoshikawa et al. |
| 4,641,922 | A | | 2/1987 | Jacob |
| 4,688,900 | A | | 8/1987 | Doane et al. |
| 4,688,901 | A | | 8/1987 | Albert |

(Continued)

FOREIGN PATENT DOCUMENTS

| CA | 2620005 | 7/2008 |
| CN | 1189224 | 7/1998 |

(Continued)

OTHER PUBLICATIONS

J. C. C. Fan, F. J. Bachner, R. A. Murphy, 'Thin-film conducting microgrids as transparent heat mirrors', Appl. Phys. Lett., vol. 28, No. 8, Apr. 15, 1976, pp. 440-442.*

(Continued)

*Primary Examiner* — Arnel C Lavarias
(74) *Attorney, Agent, or Firm* — Dorsey & Whitney LLP (57) ABSTRACT

A high-transparency, low-emissivity window film or coating is designed to maximize so-called greenhouse heating. This effect is achieved through the use of conductive grids and/or gratings whose width and spacing has been selected such that the grid appears as a uniform conductive film to long-wavelength infrared (blackbody) radiation. The conductive grid film reflects the blackbody radiation strongly, and such that the grid appears highly transparent to visible and near-infrared light, and therefore transmits it.

34 Claims, 5 Drawing Sheets

(56) References Cited

U.S. PATENT DOCUMENTS

| | | |
|---|---|---|
| 4,755,673 A | 7/1988 | Pollack et al. |
| 4,756,758 A | 7/1988 | Lent et al. |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,859,994 A | 8/1989 | Zola et al. |
| 4,871,220 A | 10/1989 | Kohin |
| 4,877,675 A | 10/1989 | Falicoff et al. |
| 4,893,902 A | 1/1990 | Baughman et al. |
| 4,899,503 A | 2/1990 | Baughman et al. |
| 4,964,251 A | 10/1990 | Baughman et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,132,147 A | 7/1992 | Takiguchi et al. |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,212,584 A | 5/1993 | Chung |
| 5,227,115 A | 7/1993 | Harnischfeger |
| 5,274,246 A | 12/1993 | Hopkins et al. |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai |
| 5,377,042 A | 12/1994 | Chahroudi |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,640 A | 12/1996 | Huston |
| 5,757,828 A | 5/1998 | Ouchi |
| 5,763,307 A | 6/1998 | Wang |
| 5,881,200 A | 3/1999 | Burt |
| 5,889,288 A | 3/1999 | Futatsugi |
| 5,897,957 A | 4/1999 | Goodman |
| 5,937,295 A | 8/1999 | Chen |
| 5,940,150 A | 8/1999 | Faris et al. |
| 6,040,859 A | 3/2000 | Takahashi |
| 6,055,089 A | 4/2000 | Schulz et al. |
| 6,099,758 A | 8/2000 | Verrall et al. |
| 6,122,103 A | 9/2000 | Perkins et al. |
| 6,208,463 B1 | 3/2001 | Hansen |
| 6,218,018 B1 | 4/2001 | McKown et al. |
| 6,226,067 B1 | 5/2001 | Nishiguchi et al. |
| 6,240,114 B1 | 5/2001 | Anselm |
| 6,260,414 B1 | 7/2001 | Brown et al. |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee |
| 6,320,220 B1 | 11/2001 | Watanabe |
| 6,329,668 B1 | 12/2001 | Razeghi |
| 6,333,516 B1 | 12/2001 | Katoh |
| 6,381,068 B1 | 4/2002 | Harada et al. |
| 6,437,361 B1 | 8/2002 | Matsuda |
| 6,446,402 B1 | 9/2002 | Byker et al. |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz |
| 6,611,640 B2 | 8/2003 | LoCascio |
| 6,635,898 B2 | 10/2003 | Williams et al. |
| 6,661,022 B2 | 12/2003 | Morie |
| 6,671,008 B1 | 12/2003 | Li et al. |
| 6,710,823 B2 | 3/2004 | Faris et al. |
| 6,718,086 B1 | 4/2004 | Ford |
| 6,730,909 B2 | 5/2004 | Butler |
| 6,753,273 B2 | 6/2004 | Holonyak, Jr. et al. |
| 6,770,916 B2 | 8/2004 | Ohshima |
| 6,777,718 B2 | 8/2004 | Takagi |
| 6,816,525 B2 | 11/2004 | Stintz |
| 6,847,662 B2 | 1/2005 | Bouda |
| 6,859,114 B2 | 2/2005 | Eleftheriades |
| 6,912,018 B2 | 6/2005 | Faris et al. |
| 6,926,952 B1 | 8/2005 | Weber et al. |
| 6,933,812 B2 | 8/2005 | Sarabandi |
| 6,946,697 B2 | 9/2005 | Pietambaram |
| 6,963,435 B2 | 11/2005 | Mallya et al. |
| 6,965,420 B2 | 11/2005 | Li et al. |
| 6,978,070 B1 | 12/2005 | McCarthy et al. |
| 6,985,291 B2 | 1/2006 | Watson |
| 6,992,822 B2 | 1/2006 | Ma et al. |
| 7,026,641 B2 | 4/2006 | Mohseni |
| 7,038,745 B2 | 5/2006 | Weber et al. |
| 7,042,615 B2 | 5/2006 | Richardson |
| 7,046,441 B2 | 5/2006 | Huang |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |
| 7,245,431 B2 | 7/2007 | Watson et al. |
| 7,276,432 B2 | 10/2007 | McCarthy et al. |
| 7,300,167 B2 | 11/2007 | Fernando et al. |
| 7,318,651 B2 | 1/2008 | Chua |
| 7,351,346 B2 | 4/2008 | Little |
| 7,385,659 B2 | 6/2008 | Kotchick et al. |
| 7,470,925 B2 | 12/2008 | Tamura |
| 7,522,124 B2 | 4/2009 | Smith |
| 7,532,397 B2 | 5/2009 | Tanaka |
| 7,538,946 B2 | 5/2009 | Smith |
| 7,561,332 B2 | 7/2009 | Little et al. |
| 7,601,946 B2 | 10/2009 | Powers |
| 7,619,816 B2 | 11/2009 | Deng |
| 7,655,942 B2 | 2/2010 | McCarthy et al. |
| 7,755,829 B2 | 7/2010 | Powers et al. |
| 7,768,693 B2 | 8/2010 | McCarthy et al. |
| 7,911,563 B2 | 3/2011 | Hung |
| 7,936,500 B2 | 5/2011 | Powers |
| 7,977,621 B2 | 7/2011 | McCarthy |
| 8,072,672 B2 | 12/2011 | Powers et al. |
| 8,076,661 B2 | 12/2011 | McCarthy et al. |
| 8,271,241 B2 | 9/2012 | Akyurtlu |
| 2002/0079485 A1 | 6/2002 | Stintz et al. |
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris et al. |
| 2002/0141029 A1 | 10/2002 | Carlson et al. |
| 2002/0152191 A1 | 10/2002 | Hollenberg |
| 2002/0180916 A1 | 12/2002 | Schadt et al. |
| 2002/0190249 A1 | 12/2002 | Williams |
| 2003/0052317 A1 | 3/2003 | Ohshima |
| 2003/0059998 A1 | 3/2003 | Holonyak, Jr. |
| 2003/0066998 A1 | 4/2003 | Lee |
| 2003/0107813 A1 | 6/2003 | Clabburn et al. |
| 2003/0107927 A1 | 6/2003 | Yerushalmi |
| 2003/0129247 A1 | 7/2003 | Ju et al. |
| 2003/0138209 A1 | 7/2003 | Chan |
| 2003/0214632 A1 | 11/2003 | Ma et al. |
| 2003/0218712 A1 | 11/2003 | Kumar et al. |
| 2003/0227663 A1 | 12/2003 | Agrawal et al. |
| 2004/0005451 A1 | 1/2004 | Kretman et al. |
| 2004/0012749 A1 | 1/2004 | Freeman |
| 2004/0036993 A1* | 2/2004 | Tin .................. 359/883 |
| 2004/0256612 A1 | 12/2004 | Mohseni |
| 2005/0068629 A1 | 3/2005 | Fernando et al. |
| 2005/0185125 A1 | 8/2005 | Miyachi et al. |
| 2005/0221128 A1 | 10/2005 | Kochergin |
| 2005/0271092 A1 | 12/2005 | Ledentsov |
| 2006/0011904 A1 | 1/2006 | Snyder et al. |
| 2006/0147810 A1 | 7/2006 | Koch |

(56) References Cited

U.S. PATENT DOCUMENTS

| | | |
|---|---|---|
| 2006/0151775 A1 | 7/2006 | Hollenberg |
| 2006/0238867 A1 | 10/2006 | Takeda et al. |
| 2006/0257090 A1 | 11/2006 | Podolskiy |
| 2006/0262398 A1 | 11/2006 | Sangu et al. |
| 2006/0274218 A1 | 12/2006 | Xue |
| 2007/0070276 A1 | 3/2007 | Tan et al. |
| 2007/0121034 A1 | 5/2007 | Ourderkirk et al. |
| 2007/0215843 A1 | 9/2007 | Soukoulis et al. |
| 2007/0279727 A1 | 12/2007 | Gandhi et al. |
| 2008/0008857 A1 | 1/2008 | Kalkanoglu et al. |
| 2008/0013174 A1 | 1/2008 | Allen et al. |
| 2008/0061222 A1 | 3/2008 | Powers et al. |
| 2008/0117500 A1 | 5/2008 | Narendran et al. |
| 2008/0138543 A1 | 6/2008 | Hoshino et al. |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128893 A1 | 5/2009 | McCarthy et al. |
| 2009/0128907 A1 | 5/2009 | Takahashi et al. |
| 2009/0167971 A1 | 7/2009 | Powers et al. |
| 2009/0219603 A1 | 9/2009 | Xue |
| 2009/0266394 A1 | 10/2009 | Tsubone |
| 2009/0268273 A1 | 10/2009 | Powers et al. |
| 2009/0296190 A1 | 12/2009 | Anderson et al. |
| 2010/0015363 A1 | 1/2010 | Chiang et al. |
| 2010/0027099 A1 | 2/2010 | McCarthy et al. |
| 2010/0045924 A1 | 2/2010 | Powers et al. |
| 2010/0051898 A1 | 3/2010 | Kim, II |
| 2010/0060844 A1 | 3/2010 | Sawatari et al. |
| 2010/0118380 A1 | 5/2010 | Xue |
| 2010/0232017 A1 | 9/2010 | McCarthy et al. |
| 2010/0259698 A1 | 10/2010 | Powers et al. |
| 2010/0271686 A1 | 10/2010 | Powers et al. |
| 2010/0288947 A1 | 11/2010 | McCarthy et al. |
| 2011/0025934 A1 | 2/2011 | McCarthy et al. |
| 2011/0044061 A1 | 2/2011 | Santoro et al. |
| 2011/0102878 A1 | 5/2011 | McCarthy et al. |
| 2011/0205650 A1 | 8/2011 | Powers et al. |
| 2011/0216254 A1 | 9/2011 | McCarthy et al. |
| 2011/0234944 A1 | 9/2011 | Powers et al. |
| 2011/0292488 A1 | 12/2011 | McCarthy |
| 2012/0140311 A1 | 6/2012 | Powers et al. |

FOREIGN PATENT DOCUMENTS

| | | |
|---|---|---|
| CN | 1350648 | 5/2002 |
| CN | 1494091 | 5/2004 |
| EP | 1162496 | 12/2001 |
| GB | 2261989 | 6/1993 |
| JP | 49-94145 | 6/1974 |
| JP | 58010717 | 1/1983 |
| JP | 59-231516 | 12/1984 |
| JP | 61223719 | 10/1986 |
| JP | 1178517 A | 7/1989 |
| JP | 02-089426 | 3/1990 |
| JP | 05-147983 | 6/1993 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004/012818 | 1/2004 |
| JP | 2004-291345 | 10/2004 |
| JP | 2005-250119 | 9/2005 |
| JP | 2006-243485 | 9/2006 |
| JP | 2006-285242 | 10/2006 |
| JP | 2007-065232 | 3/2007 |
| JP | 2007-515661 | 6/2007 |
| JP | 2007-272016 | 10/2007 |
| JP | 2008-530766 | 8/2008 |
| KR | 10-2002-0044153 | 2/2003 |
| KR | 10-2004-0048916 | 6/2004 |
| KR | 10-2004-0108816 | 12/2004 |
| KR | 10-2003-0072578 | 4/2005 |
| KR | 10-2006-0000059 | 1/2006 |
| KR | 10-2007-0091314 | 9/2007 |
| KR | 10-2010-0039401 | 4/2010 |
| WO | WO 94/02313 | 2/1994 |
| WO | WO 97/01789 | 1/1997 |
| WO | WO 01/23173 | 4/2001 |
| WO | 2002/064937 | 8/2002 |
| WO | WO 03/029885 | 4/2003 |
| WO | WO 03/096105 | 11/2003 |
| WO | 2005/031437 | 4/2005 |
| WO | WO 2006/023195 A2 | 2/2006 |
| WO | 2006/088369 | 8/2006 |
| WO | WO 2008/092038 | 7/2008 |
| WO | WO2008/106596 | 9/2008 |
| WO | 2008/144214 | 11/2008 |

OTHER PUBLICATIONS

Hao, J. et al., "Manipulating Electromagnetic Wave Polarizations by Anisotropic Metamaterials," Physical Review Letters, 2007, vol. 99, No. 063908.

Sarychev, et al., "Negative refraction metamaterials," Chapter 8 (Wiley 2005).

Sung, J., et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

West, J. L., et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

Author Unknown, "Liquid Crystal Research," http://chirality.swarthmore.edu, printed Aug. 21, 2009.

Barbagallo, S., et al., "Synthesis of novel metamaterials," Chapter 2 (VDM Verlag 2008).

Eleftheriades, G.V., et al. (Editors); Iyers, "Negative-Refraction Metamaterials," Chapter 1 (Wiley 2005), pp. 4-5, 16-30, 321-330.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Zhang, W., Giant optical activity in dielectric planar metamaterials with two-dimensional chirality, Journal of Optics A: Pure and Applied Optics, 8, pp. 878-890 (2006).

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea.

Manea, E., et al., "Optical Characterization of SnO2 thin Films, Prepared by Sol Gel Method, for Honeycomb Textured Silicon Solar Cells," International Semiconductor Conference, 2006, vol. 1, Issue, Sep. 2006, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Siegel, J. D., "The MSVD Low E 'Premium Performance' Myth," International Glass Review, Issue 1, 2002.

(56) References Cited

OTHER PUBLICATIONS

Goldhaber-Gordon, et al., "Overview of nanoelectronic devices", Proceedings of the IEEE, vol. 85 (4), Apr. 1997, 521-533.
Harrison, "Quantum wells, wires, and dots: theoretical & computational physics of semiconductor nanostructures", 2nd Edition, 2005, 3 pages.
Leatherdale, et al., "Photoconductivity in CdSe quantum dot solids", Physical Review B, vol. 62 (4), Jul. 15, 2000, 2669-2680.
Prosecution Document, "EP Search Report dated Mar. 30, 2012", EP Application No. 08832045.2, Mar. 30, 2012, 7 pages.
Yamazaki et al., "Polarisation-insensitive parametric wavelength conversion without tunable filters for converted light extraction," Electronic Letters, IEE Stevenage, GB (Mar. 16, 2006) 42(6) 365-367.
Prosecution Document Australian Application No. 2008302125, Preliminary Amendment dated Oct. 29, 2010, 20 pages.
Prosecution Document Australian Application No. 2008302125, First Office Action dated Jan. 31, 2011, 2 pages.
Prosecution Document Australian Application No. 2008302125, Response to First Office Action dated Dec. 8, 2011, 1 page.
Prosecution Document Australian Application No. 2008302125, Notice of Acceptance dated Dec. 15, 2011, 3 pages.
Prosecution Document Canadian Application No. 2,703,010, First Office Action dated Feb. 6, 2012, 2 pages.
Prosecution Document Canadian Application No. 2,703,010, Response to First Office Action dated Jun. 22, 2012, 3 pages.
Prosecution Document Chinese Application No. 200880116846.4, First Office Action (with English Summary) dated Jun. 24, 2011, 5 pages.
Prosecution Document Chinese Application No. 200880116846.4, Response to First Office Action (with English Summary) dated Nov. 8, 2011, 16 pages.
Prosecution Document Chinese Application No. 200880116846.4, Second Office Action (with English Summary) dated Apr. 27, 2012, 4 pages.
Prosecution Document Chinese Application No. 200880116846.4, Response to Second Office Action (with English Summary) dated Sep. 12, 2012, 16 pages.
Prosecution Document European Application No. 08832045.2, Response to Extended European Search Report dated Oct. 16, 2012, 17 pages.
Prosecution Document European Application No. 08832045.2, Voluntary Amendment dated Oct. 24, 2012, 5 pages.
Prosecution Document Korean Application No. 10-2010-7008336, First Office Action (with English Summary) dated Sep. 15, 2011, 4 pages.
Prosecution Document Korean Application No. 10-2010-7008336, Response to First Office Action (with English Summary) dated Mar. 15, 2012, 20 pages.
Prosecution Document Korean Application No. 10-2010-7008336, Second Office Action (with English Summary) dated Aug. 8, 2012, 7 pages.
Extended European Search Report dated Mar. 30, 2012, EP Application No. 08832045.2, 7 pages.
Communication Pursuant to Rules 70(2) and 70a(2) dated Apr. 18, 2012, EP Application No. 08832045.2, page.
Response to Rules 70(2) and 70a(2) Communication dated Oct. 16, 2012, EP Application No. 0832045.2, 17 pages.
Voluntary Amendment dated Oct. 24, 2012, EP Application No. 08832045.2, 5 pages.
Preliminary Amendment dated Oct. 29, 2010, AU Application No. 2008302125, 20 pages.
First Office Action dated Jan. 31, 2011, AU Application No. 2008302125, 2 pages.
Response to First Office Action dated Dec. 8, 2011, AU Application No. 2008302125, 1 page.
Notice of Acceptance dated Dec. 15, 2011, AU Application No. 2008302125, 3 pages.
First Office Action dated Mar. 26, 2012, CA Application No. 2,703,010, 2 pages.
Response to First Office Action dated Jun. 7, 2012, CA Application No. 2,703,010, 13 pages.
Second Office Action dated Jan. 21, 2013, CA Application No. 2,703,010, 3 pages.
Response to Second Office Action dated Jul. 22, 2013, CA Application No. 2,703,010, 5 pages.
Third Office Action dated Nov. 19, 2013, CA Application No. 2,703,010, 3 pages.
First Office Action dated Jul. 4, 2011 (with English summary), CN Application No. 200880116846.4, 5 pages.
Response to First Office Action dated Nov. 11, 2011 (with English summary), CN Application No. 200880116846.4, 16 pages.
Second Office Action dated Apr. 27, 2012 (with English summary), CN Application No. 200880116846.4, 4 pages.
Response to Second Office Action dated Oct. 22, 2012 (with English summary), CN Application No. 200880116846.4, 16 pages.
First Office Action dated Sep. 15, 2011 (with English summary), KR Application No. 10-2010-7008336, 4 pages.
Response to First Office Action dated Mar. 15, 2012 (with English summary), KR Application No.10-2010-7008336, 20 pages.
Second Office Action dated Aug. 8, 2012 (with English summary), KR Application No. 10-2010-7008336, 7 pages.
Response to Second Office Action dated Feb. 8, 2013 (with English summary), KR Application No. 10-2010-7008336, 19 pages.
Notice of Acceptance dated Jun. 19, 2013, KR Application No. 10-2010-7008336, 2 pages.
First Office action dated Oct. 22, 2012 (with English translation), JP Application No. 2010-526016, 7 pages.
Response to First Office Action dated Apr. 24, 2013 (with English Summary), JP Application No. 2010-526016, 14 pages.
Final Office Action dated Jun. 11, 2013 (with English translation), JP Application No. 2010-526016, 7 pages.
Response to Final Office Action dated Dec. 10, 2013 (with English summary), JP Application No. 2010-526016, 17 pages.
Korean Intellectual Property Office as International Searching Authority, International Search Report and Written Opinion for International Application No. PCT/US2008/077095, Jan. 29, 2009. 3 pages.

* cited by examiner

LOW-EMISSIVITY WINDOW FILMS AND COATINGS INCORPORATING NANOSCALE WIRE GRIDS

CROSS REFERENCE TO RELATED APPLICATIONS

This application claims the benefit of priority pursuant to 35 U.S.C. §119(e) of U.S. provisional patent application No. 60/994,370 filed 19 Sep. 2007 entitled "Low-emissivity window films and coatings incorporating nanoscale wire grids," which is hereby incorporated herein by reference in its entirety.

BACKGROUND

1. Field of the Invention

This invention relates to a high-transparency, low-emissivity window film or coating. The technology has particular, but not exclusive, application as an energy-saving enhancement for windows in buildings, vehicles, and passive solar heat absorbers.

2. Description of the Related Art

In double-paned glass windows, approximately 60% of the heat transfer through the window center occurs not by conduction or convection, but by the absorption and re-emission of long-wavelength infrared—the so-called blackbody radiation emitted by objects at or near room temperature—with wavelengths between 5 and 20 microns. This occurs because glass strongly absorbs radiant energy at these wavelengths, and thanks to an emissivity of 80-90%, it also strongly emits at these wavelengths when warmed. Thus, although the glass is not transparent to long-wave infrared, through absorption and re-radiation it behaves in some ways as though it were.

Traditionally, this heat transfer is reduced through the addition of a low-emissivity coating to one or more of the glass surfaces. For example, a thin (<10 nm), film of aluminum, silver, or gold has an emissivity of around 10%-25% meaning (a) that the film is highly reflective to long-wavelength infrared, and (b) that when the film is heated, it tends to retain its heat rather than radiating it away. However, these films are still largely transparent, i.e., they allow a large fraction of visible and near-infrared (NIR) light to pass through unattenuated. This sharply reduces the radiative heat transfer across the air gap between the window panes, and thus increase the effective insulation value of the double-paned structure, while still allowing it to serve as a window.

A "dielectric mirror" is a multilayered structure in which the mismatch of dielectric constant between two materials (e.g., a metal and a transparent ceramic or polymer) is maximized. This produces an optical index mismatch that results in very high reflectivity across a broad band of wavelengths, with the corner frequency (i.e., the cutoff between high transparency and high reflection) being determined by the thickness of the layers. In essence, a dielectric mirror is the exact opposite of an antireflection coating. Since the 1990s it has become standard practice to enhance the low-emissivity properties of metal films by assembling them in one or more alternating layers of metal and dielectric to maximize reflection of long-wavelength "blackbody" infrared radiation. This allows for emissivities as low as 2.5% in a structure that nevertheless transmits a significant fraction of visible and solar radiation (e.g., Tvis=41.4% and Tsol=21.5% for AFG Sunbelt Low-E glass as reported in the International Glazing Database, version 15.1).

More recently, pyrolytic ceramic coatings have also seen use as low-emissivity window filters (as described for example in *The MSVD Low E 'Premium Performance' Myth*, John D. Siegel, International Glass Review, Issue 1, 2002). Such coatings are semi-crystalline metal oxides such as tin oxide (SnO) deposited onto the glass by a chemical vapor deposition (CVD) process. These tend to have higher emissivities than metal and metal-dielectric coatings, but are more transmissive to visible and NIR photons. This gives them a higher solar heat gain coefficient (SHGC), making them more suitable for use in cold, sunny climate zones. These coatings are also more robust than "soft" metallic coatings and thus easier to handle in an industrial setting, for example because they do not require a brushless washing process. Indium tin oxide (ITO), a conductive ceramic widely used in video displays, has also seen limited use as a low-emissivity coating, particularly in "heat mirrors" designed to keep optics cool. In *Transparent Conducting Oxides*, MRS Bulletin August 2000, David S. Ginley and Clark Bright disclose other "low-E" ceramic coatings including cadmium tin oxide ($Cd_2SnO_4$), zinc tin oxide ($ZnSnO_4$), magnesium indium oxide ($MgIn_2O_4$), gallium indium oxide ($GaInO_3$), zinc indium oxide ($Zn_2In_2O_3$), copper aluminum oxide ($CuAlO_2$), and aluminum silicon nitride (AlSiN).

Unfortunately, even for very transparent, pyrolytic, low-E coatings, some reflection and absorption of photons also occurs in the coating itself in the visible and particularly in the NIR wavelengths, so that the coated glass pane is only 80-90% transmissive to visible light and 50-65% transmissive to the solar spectrum overall vs. 77% for standard 6 mm clear float glass and tip to 90% for low-iron glass of the same thickness. This reduces the solar heat gain through the pane, which may be undesirable in colder climate zones where solar heating is desirable, or in passive solar devices whose primary purpose is to gather and store solar heat.

Certain optical filters, including distributed Bragg reflectors and Rugate filters, can be designed to operate in blackbody wavelengths, and may seem to behave as ideal longpass filters within a certain limited range. In other words, they reflect radiant energy above a threshold wavelength and transmit radiant energy below that wavelength. However, all of these filters are actually band reflectors, meaning they become transmissive again above a second threshold wavelength. In fact, the practical limitations of real-world materials generally limit the bandwidth of these reflectors to no more than a few hundred nanometers, which is a small fraction of the ~15,000-nm-wide blackbody spectrum.

Wire grid polarizers attenuate slightly more than 50% of the light passing through them by reflecting away light of one polarization while allowing light of perpendicular polarization to pass through. Wire-grid polarizers that reflect infrared light, rather than absorb it, have been described since the 1960s, for example, in U.S. Pat. No. 4,512,638 to Sriram, et al. With the advent of nanoscale lithography in the 1990s and 2000s, it became possible to produce broadband wire-grid polarizers that reflect in visible wavelengths, for use with high-end optics and laser technology as described, for example in U.S. Pat. No. 6,122,103 to Perkins, et al. Such devices require parallel metal wires (technically a "grating" rather than a "grid", although the latter term is commonly used) that are tens of nanometers wide and spaced hundreds of nanometers apart. One advantage of these polarizers is that they are just as effective in reflecting/polarizing long-wavelength infrared, and even microwave and radio wavelengths, as they are in polarizing visible light.

Numerous conductive meshes, grids, and drilled plates that are used as shields against, or reflectors of, microwave and radio frequency (RF) radiation are known. One example is the metal screen covering the glass or transparent plastic door of a microwave oven. As long as the holes in the mesh are significantly smaller than the 5-12 cm wavelength output by the oven's magnetron, the mesh will behave to those wavelengths as though it were a uniformly conductive film or plate, and thus will reflect the microwave radiation. However, because visible light has a wavelength much smaller than the holes in the mesh, it is able to pass through the holes just as it would through holes in a non-conductive material. Thus, food cooking inside the oven is visible without exposing the operation to harmful microwave radiation.

The information included in this Background section of the specification, including any references cited herein and any description or discussion thereof, is included for technical reference purposes only and is not to be regarded as subject matter by which the scope of the invention is to be bound.

SUMMARY

This technology is directed to increasing the effective insulation value of window glass and other transparent or translucent building materials by reducing their emissivity to long-wavelength (blackbody) infrared emitted by room-temperature objects, while preserving a high transmissivity to the solar spectrum from roughly 250 nm-2500 nm in order to facilitate the retention of solar heat within a device, structure, or vehicle. In one implementation, a device for reducing the emissivity of a window to long-wavelength infrared light is a film of conductive material. The film is formed in a pattern as an arrangement of thin conductive material elements and void areas. The thin conductive material elements are spaced apart a distance such that the conductive material is highly reflective to long-wavelength infrared light and highly transmissive to visible and near-infrared light.

In another implementation, the thin conductive material elements may take the form of microscale and nanoscale wire grids, gratings, or coatings that are designed to produce a high transmissivity, low-emissivity (low-E), window film (hereinafter "gridded low-E film"). The gridded low-E film has particular, but not exclusive, application in regulating the temperatures of buildings, vehicles, and passive solar devices by maximizing their intake of solar radiation while restricting the amount of blackbody radiation they can emit.

This gridded low-emissivity film or coating increases the effective insulation value of windows significantly beyond what is possible with ordinary glass or polymers. It is more transmissive to the solar spectrum than existing low-E films and coatings gridded. The low-emissivity film or coating provides improved of absorption and trapping of solar heat in buildings, vehicles, and passive solar devices that is particularly useful in cold, sunny climates.

This technology allows windows with a gridded low-E film or coating to be more optically similar to ordinary gridded glass or polymer windows for aesthetic reasons. The low-E film or coating may be placed on materials that are thick or thin, strong or weak, rigid or flexible, monolithic or made up of separate parts, without altering its basic function in any significant way.

Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

Please note that closely related elements have the same element numbers in all figures.

DETAILED DESCRIPTION

Figure 1:
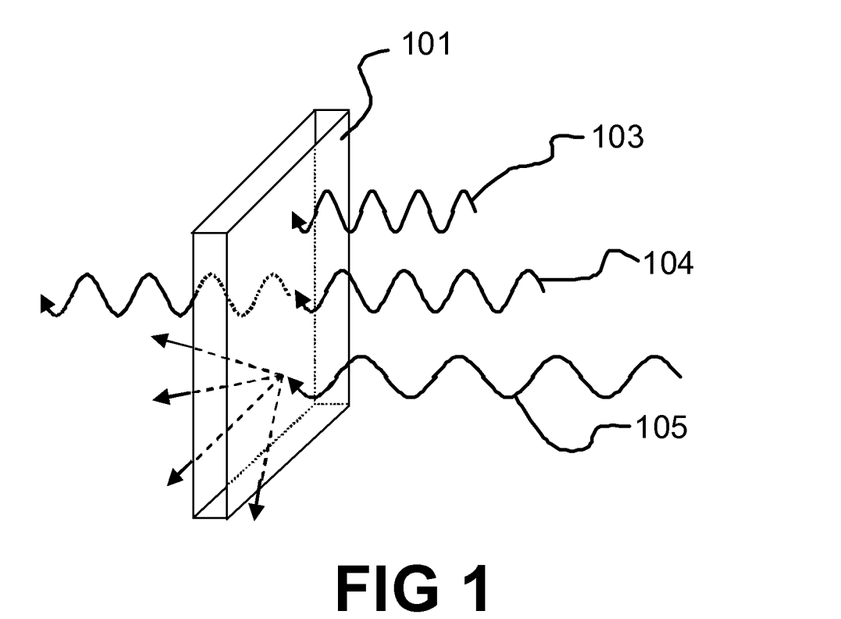
FIG. 1 is a schematic view of a standard glass or plastic windowpane.

FIG. 1 is a schematic view of an ordinary glass or plastic windowpane 101. When struck by an ultraviolet photon 103, the windowpane 101 absorbs it, because ultraviolet wavelengths fall outside the transmission band of the window material. When struck by a photon 104 of near-ultraviolet, visible, or near infrared (NIR) light, the windowpane 101 transmits it through, because these wavelengths fall within the transmission band of the window material. When struck by a long-wavelength infrared (blackbody) photon, the windowpane 101 again absorbs it, because these long wavelengths fall outside the transmission band of the window material. However, in absorbing this energy the windowpane is locally heated, and therefore locally increases its own blackbody radiation according to the Stephan-Boltzmann law. Thus, blackbody photons may seem to "pass through" the windowpane, in either a collimated or a diffuse manner, as shown in the FIG. 1.

This behavior is normal and expected for transparent materials, but is undesirable in building materials where a large temperature gradient exists across the material's thickness (e.g., across the windows of a warm house on a cold day), because it allows heat to escape from the building by radiative means.

Figure 2:
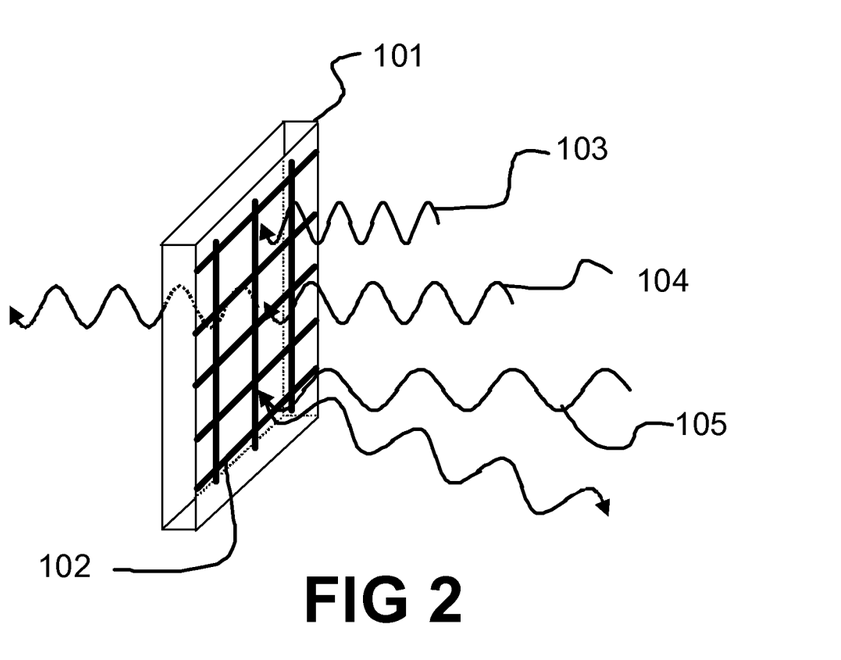
FIG. 2 is a schematic view of one implementation of a glass or plastic windowpane covered with a low-E metal mesh.

FIG. 2 is a schematic, cutaway view of the same windowpane, except that a wire mesh, grating, or grid 102 has been added to its surface. The spacing between the wires is selected to be significantly smaller than a wavelength of blackbody radiation, i.e., smaller than 5-20 microns, while also being larger than most or all wavelengths of visible light, i.e., larger than 600 nanometers or 0.6 microns. Within this range, the exact spacing will have significant effects on the transmission and reflection properties of the grid. However, the width of the wires is selected to be much less than the spacing, so that the fraction of the windowpane's surface actually blocked by the wires is minimal. For example, if the wires are 15 nm wide and spaced 1500 nm apart, approximately 1% of the surface is obstructed, and 99% is unobstructed. In this case, geometrical obstruction of the surface by the wire grid does not play a significant role in the total transmissivity of the window.

In FIG. 2, the ultraviolet photon 103 is absorbed and the NUV/VIS/NIR photon is transmitted as before in FIG. 1. However, to the blackbody photon 105, the wire grid 102 is indistinguishable from a smooth conductive plate. Therefore, the blackbody photon 105 is reflected. This has two effects. First, it prevents this surface of the windowpane from absorbing blackbody photons that have been emitted by other objects. Second, it prevents the windowpane from emitting its own blackbody photons through this surface, because such photons are simply reflected back into the windowpane material and reabsorbed. Thus, the wire grid dramatically lowers the effective emissivity of the windowpane in the long-wavelength infrared.

As long as the wires are parallel and widely spaced, they do not need to be particularly straight or particularly uniform in thickness in order to perform the desired function of reflecting long wavelengths and transmitting short wavelengths. Both the positions and widths of the wires could wander by several tens of nanometers without significantly affecting the grid's performance as a low-emissivity film. However, the wires do need to be wide enough and tall enough to be good conductors. Wires thinner than 10 nm, made from conductors that oxidize readily under ambient conditions, and whose oxides are poor conductors, may not be suitable for this application unless they are overcoated with a transparent material to prevent oxidation. For uncoated use, exemplary metallic conductors of silver, aluminum, or gold and of wire thickness 15 nm or greater function well, although other materials and thicknesses may also be used.

This effect is analogous to a Faraday cage, a mesh screen with a periodic structure that repeats on a millimeter, centimeter, or meter scale and which blocks RF radiation while allowing shorter-wavelength radiation to pass unimpeded. It is also analogous to the microwave shielding screens found in microwave ovens. Also, the difference between a grid or grating of conductive wires laid out on a surface, and a conductive plate or film patterned with an array of holes or linear gaps, is largely semantic and makes little or no difference in the electrical or optical performance of the grid or grating. Thus, the terms grid, grating, and patterned film are interchangeable as used herein. In view of this possible diversity in implementation, a device for reducing the emissivity of a window to long-wavelength infrared light may be generalized as a film of conductive material formed in a pattern as an arrangement of thin conductive material elements and void areas. The thin conductive material elements are then arranged or spaced apart a distance such that the conductive material is highly reflective to long-wavelength infrared light and highly transmissive to visible and near-infrared light.

Optionally, the grid or grating may be overcoated with a layer of dielectric, IR-opaque material without significantly affecting its performance as a low-emissivity window covering, provided the film thickness of the overcoat is significantly less than the extinction distance of a blackbody photon in the overcoat material. An overcoat of a material such as diamond, that is transparent to visible, near-infrared, and blackbody radiation may be desirable in some applications. However, while such coatings may increase the durability of the wire grid, they are not necessary to its function as a gridded low-emissivity surface.

The "wires" can be strips of any low-emissivity material or stack of materials, and the use of transparent conducting oxides for this purpose will maximize the transmissivity to solar radiation without significantly compromising the reflectivity to long-wavelength (blackbody) infrared. Such transparent conducting oxides can be used either monolithically or in alternating layers to form a dielectric mirror. Strips of metal-and-oxide dielectric mirror may also be used to enhance the emissivity, although this will provide less transmissivity than strips of oxide alone.

The grid or grating structure can be laid down by any number of methods of micropatterning large surfaces. For example, the surface may be patterned with photolithography, electron beam lithography, nanoimprint lithography, or microcontact printing. The required feature sizes are readily achievable with current technology and do not present a formidable challenge. For example, the video display industry employs high-throughput equipment for patterning areas of several square meters, comparable to the dimensions required for patterning architectural glass.

Much cruder methods are also possible. For example, microscopic beads or other objects may be scattered on a glass surface before deposition of a coating and then wiped away afterward. The coating may be stenciled or applied by ink-jet onto the surface, or the surface may be patterned via chemical self-assembly using sol-gel inks or block copolymers.

In one embodiment, the surface patterning and the deposition of the low-E coating may be performed in a single operation via a sol-gel process, as described for example in *Optical Characterization Of SnO2 thin Films, Prepared by Sol Gel Method, for "Honeycomb" Textured Silicon Solar Cells*, Manea, E.; Budianu, E.; Purica, M.; Podaru, C.; Popescu, A.; Cernica, I.; Babarada, F., International Semiconductor Conference, 2006, Volume 1, Issue, September 2006 Page(s):179-182, which is hereby incorporated herein by reference. The intention of that process was to produce a low-reflectivity surface for photovoltaics rather than a transparent gridded low-emissivity surface for windows and other building materials. However, the same process can be used to produce honeycomb structures of PbO, ITO, and other gridded low-E metal oxide materials on glass or transparent polymer substrates, as disclosed herein.

In another implementation a method for patterning is to coat the surface of the glass with a self-organizing diblock copolymer such as polystyrene-b-poly(methyl methacrylate) (PS-b-PMMA). In this exemplary process, the low-E coating is first deposited onto the glass surface. Next, a Styrene/Benzocyclobutene/methyl methacrylate (BCB/MMA) random copolymer in exemplary proportions of 56/2/42 is dissolved to a 0.3% weight solution in toluene, deposited onto the low-E surface to a depth of 8-12 nanometers, baked at 250° C. for 30 minutes in order to crosslink the copolymers, and finally soaked for 5 minutes in toluene to remove any residual polymer. This process creates molecular "brushes" that serve as anchor points for the self-organized polymer film.

Next, a block copolymer containing approximately 70% PS and 30% PMMA is dissolved to a 1% solution in toluene, deposited onto the glass surface to a depth of approximately 30 mm, and baked at 160-190° C. in a vacuum oven for 12 hours. Under these conditions, the copolymer film self-assembles into a regular, honeycomb-shaped array of vertically oriented PMMA cylinders in a PS matrix. To cross-link the PS component of the film and render the PMMA component soluble, the sample is then cured in a vacuum under a mercury UV lamp for a total dose of >25 J/cm$^2$. The sample is then immersed in glacial acetic acid for 15 minutes to dissolve the PMMA, leaving empty cylindrical pores in the regions the PMMA had occupied. An etchant is then applied to dissolve the low-E layer in the spaces beneath the pores.

The exact chemistry of the etchant and the application time to the surface depend on the composition and thickness of the low-E surface. In general a hydrofluoric (HF) solution can be used to attack metal oxides, and a non-fluorine-bearing acid such as hydrochloric (HCl) can be used to attack metals, while leaving the polymer mask untouched. The etch mask is then removed with acetone and the process is complete.

The glass pane is now coated with a low-emissivity grid, whose pore size and spacing is a function of the molecular weight of the PS-b-PMMA copolymer as defined by the following relationship: $P=(0.5556)*(W/100)^{0.64}$, $D=P/1.74$, where P is the pore period or center-to-center spacing, W is the molecular weight in Daltons, and D is the pore diameter.

In another embodiment, the surface is patterned using photolithography. A glass lithographic photomask is prepared using standard CAD and printing techniques. DesignCAD LT is a common tool for photomask design, whose outputs can be uploaded to an automated mask printing service such as sold by Photo Sciences Corporation. The mask contains the image of a square grid which, when focused onto a surface, has gaps of approximately 0.6-0.8 microns spaced at a period of approximately 0.9-1.1 microns. At these sizes the grid will consist of perpendicularly crossed wires that are roughly 0.3 microns wide—a feature size that is readily achievable using standard mercury vapor UV lamps radiating at wavelengths of 250-400 nanometers. Smaller feature sizes are highly desirable but may require sub-wavelength interference techniques or extreme ultraviolet (EUV) reflective optics, which increase the cost and complexity of the required equipment.

The surface is coated with a fast-exposure, UV-sensitive photoresist material such as Microchem KMPR 1000, to a depth of approximately 1 micron using an inkjet printer, and baked under cleanroom conditions for 5 minutes at 100° C. The exact depth is not important except insofar as it provides a favorable aspect ratio for the features in the developed resist, and the coating also does not need to be particularly uniform or flat on the micron scale. Height variations of ±50-90% are completely acceptable and will not significantly impair the outcome of the process, as the low-E coating itself will typically be much thinner than 1 micron, typically on the order of 0.2 microns or less.

Next, the coated glass or polymer sheet is placed in a continuous scanning UV photolithography system (e.g., one of the systems available from Anvik Corporation, capable of throughputs of approximately 20 square meters per hour) and exposed with a projected, miniaturized image of the photomask. The process leaves no visible seams, and is limited to 1 μm feature size at the time of this writing, although smaller features will likely be available in the future. The continuous scanning and patterning process requires moving the glass back and forth while the patterning equipment itself remains stationary. Floor space requirement is therefore approximately twice the length and width of the largest glass pane to be patterned, plus a roughly 2-meter access corridor on three sides. For a system to pattern 3 m×4 m glass, the required floor space is approximately 10 m×10 m. The exposure wavelength is typically 365 m (although other UV wavelengths and even X-ray wavelengths will also work), and the required dose for 1 micron of KMPR 1000 is approximately 70 Joules/cm^2. A 3-minute post-exposure bake at 100° C. is recommended though not mandatory for the process.

Next, the sample is rinsed for 120 seconds with a developer solution such as Microchem SU-8 or 2.38% TMAH (0.26N) aqueous alkaline developer. There is now a void in the resist in the shape of the desired wire grid. The low-E coating is then deposited onto the surface through the holes in the resist using the standard deposition techniques described above. Finally, the remaining resist is washed away using a "stripper" solvent such as acetone or MicroChem Remover PG (NMP) in a 10-minute bath at 80° C., or with a plasma etcher. For example, a reactive ion etcher can perform the stripping operation in less than ten seconds with the following settings: 200 W power with 80 sccm O2 and 8 sccm CF4, at a pressure of 100 mTorr and a temperature of 10° C. Once the resist stripping is complete, the micropatterned low-E surface is now finished.

In another exemplary embodiment, the resist is patterned using standard offset printing techniques, sometimes referred to as Roller-type Nanoimprint Lithography or RNIL. A print plate or "shim" composed of metal, ceramic, polymer, or any other durable material (e.g., a 100-micron-thick sheet of nickel) is prepared with a pattern of microscopic knobs on it, in the size and shape of the desired holes (or in any other desired pattern), usually but not necessarily by embossing from a micropatterned quartz master, and is wrapped around a cylindrical roller. The surface to be patterned (e.g., a pane of window glass) is then coated with a liquid resist or mask material (e.g., Microchem Nano PMMA Copolymer 1% in anisol), and the roller heated to a temperature designed to dry and harden the resist (e.g., the glass transition temperature) is rolled across the surface of the glass in a standard printing process, using an apparatus essentially similar to a printing press. The patterned surface is then allowed to fully dry and cure either under ambient conditions, through a baking process (e.g., 30 minutes at 160° C.), or through exposure to an ultraviolet curing lamp (e.g., a 285 nm mercury vapor lamp). The low-E coating is then deposited through the printed pattern (e.g., through a sputtering process or chemical vapor deposition process), and the patterned resist is stripped as described above. A very similar process for patterning both flexible and rigid surfaces is described in *Survey on Roller-type Nanoimprint Lithography (RNIL) Process*, Shuhuai Lan, Hyejin Lee, Jun Ni, Soohun Lee, Moongu Lee, International Conference on Smart Manufacturing Application, Apr. 9-11, 2008 in KINTEX, Gyeonggi-do, Korea.

The foregoing descriptions are intended for exemplary purposes only, and should not be regarded as limiting the scope of the invention. A wide variety of other patterning techniques may be used without departing from the spirit of the present invention, which is a micropatterned gridded low-E surface with very high transparency to the visible spectrum.

Figure 3:
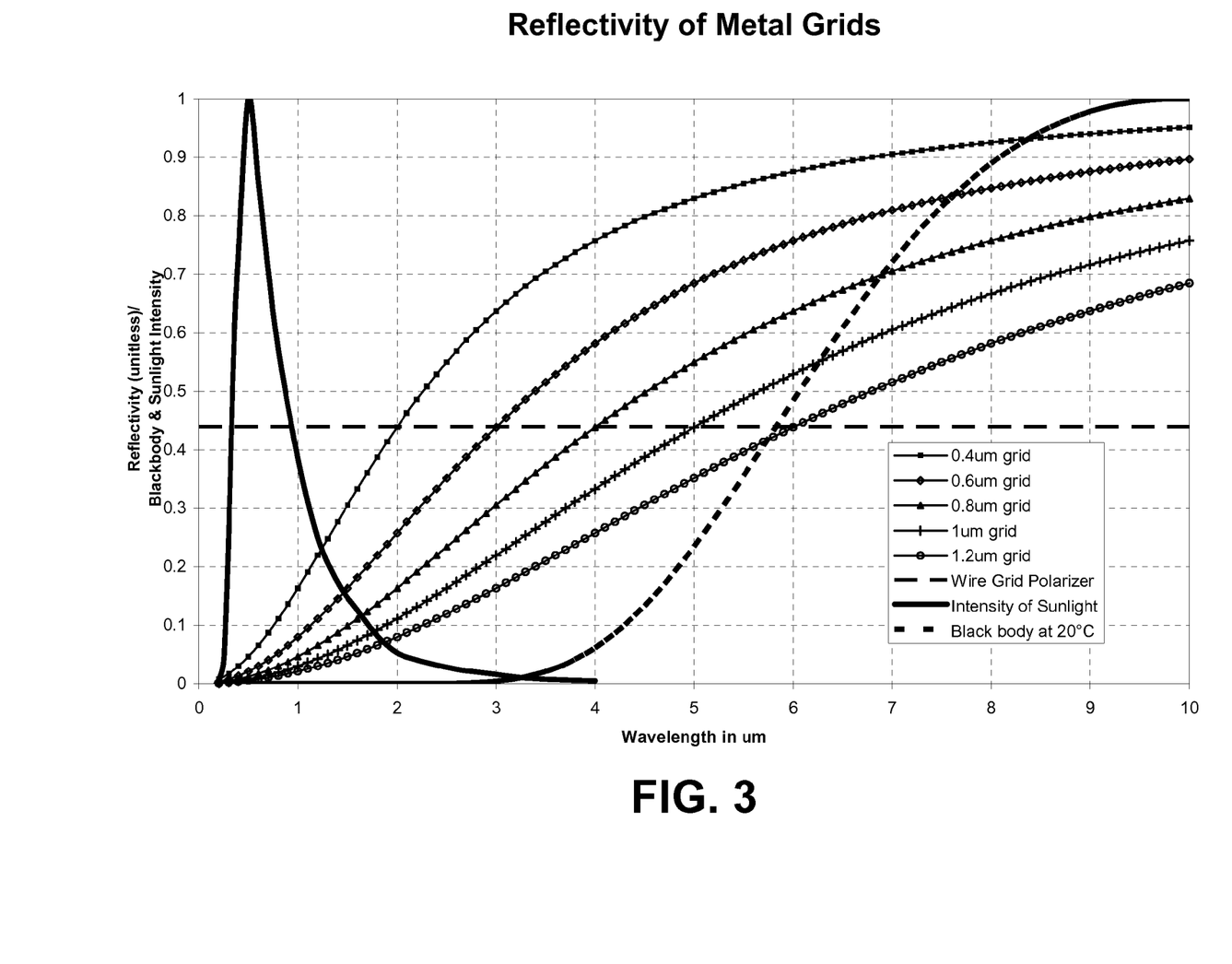
FIG. 3 is a graph showing the reflectivity vs. wavelength of low-E metal grids with various periodicity, as well as the intensity vs. wavelength of solar radiation and room-temperature blackbody radiation.

FIG. 3 is a graph showing reflectivity vs. wavelength for low-E wire grids of various spacing, and also showing intensity vs. wavelength of both sunlight and the blackbody radiation emitted by room-temperature objects. The reflection spectrum of a highly transparent, commercially available low-E film is provided for comparison (source: International Glazing Database Version 15.1). All of the grids within the selected range are highly transparent to the visible and NIR light emitted by the sun and highly reflective to blackbody radiation, and that in both cases the performance of the grids compares favorably with a monolithic low-emissivity film while providing much greater transparency to VIS and NIR wavelengths. All such grids, and derivative structures having essentially the same optical properties, considered embodiments of the present invention when employed as gridded low-emissivity window films.

It should also be noted that the curves in FIG. 3 represent wire grids of an ideal metal that reflects uniformly at all wavelengths. Aluminum, for example, is a good approximation of a perfect metal, so that the response of aluminum wire grids will closely resemble the response graphed in FIG. 3. However, "imperfect" metals such as copper and gold, while highly reflective in the near infrared and long-wavelength infrared, are substantially less reflective in the shorter wavelengths of the visible spectrum (and less conductive to electrons at the corresponding energies), which is why these metals appear yellow and red, respectively. Where such metals are used to form a low-E wire grid or grating, the reflection spectrum will be depressed at visible wavelengths, so the reflectivity vs. wavelengths curves will shift to the right as compared to the curves in FIG. 3.

At the same time, the transmission spectrum at visible wavelengths is enhanced as compared with an ideal metal (e.g., gold exhibits a transmission peak at a wavelength of around 500 mm, corresponding to green light, whereas the transmission spectrum of an ideal metal shows no peaks). As a result, the grid or grating becomes more generally transparent to solar radiation. However, because these "imperfect" metals are highly reflective at blackbody wavelengths, the grid retains comparable low-emissivity properties. For transparent conductive oxides such as SnO, the graph shifts even further to the right, since these materials are almost completely transparent to visible light while remaining highly reflective to long-wavelength infrared. FIG. 3 indicates that a low-E surface patterned with 550-nm holes at 600-nanometer periodicity would exhibit comparable emissivity to a monolithic film of the same material, while employing 65% less material and exhibiting vastly improved transmissivity to the solar spectrum.

For the purposes of this invention, it does not matter whether the low-E grid is formed by the deposition of conductive lines on an insulating surface, by the etching of holes in a solid conducting film, or by some other method. The packing arrangement of the grid openings could exhibit square or hexagonal symmetry, or pseudo-random placement of openings with well-defined average size and spacing. In addition, the shape of the holes may be square, circular, triangular, irregular, or any other shape without significantly altering the functioning of the device, although openings with one dimension highly elongated with respect to the other will tend to have a polarizing effect.

The graph of FIG. 3 also shows reflectivity vs. wavelength for a parallel grating of conductive wires, also known as a wire grid polarizer. Because of its polarizing effects, this structure has the interesting property that its reflectivity remains essentially constant—in this case, around 44%—over a broad range of wavelengths, from near ultraviolet through far infrared. Similarly, because of its polarizing properties, the grating has an emissivity of approximately 40-50% across all wavelengths, which is significantly less than the 80-90% of ordinary glass. Although wire grid polarizers are commonly used in optics, they have not been used as low-emissivity films in windows and other building materials. Such use is considered an embodiment of the present invention. As before, it should also be noted that the low-emissivity properties of the wire grating are largely preserved if the wires are overcoated with a layer of transparent dielectric material, provided the thickness of the layer is significantly less than the extinction distance of a blackbody photon in the material, or with a material that is also transparent to blackbody radiation, such as diamond.

Figure 4:
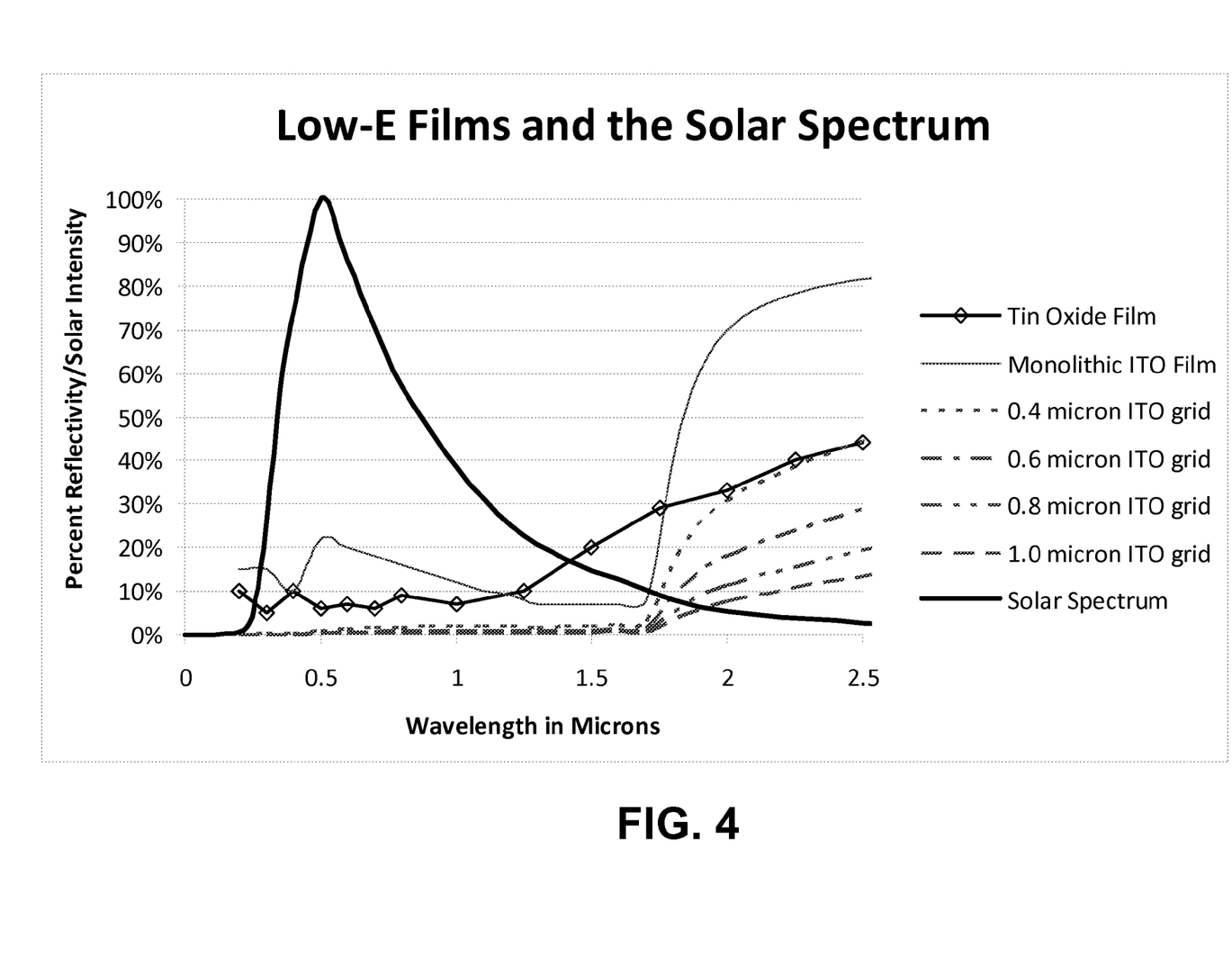
FIG. 4 is a graph showing the reflectivity vs. wavelength of pyrolytic ITO low-E grids with various periodicity, as well as the intensity vs. wavelength of solar radiation.

FIG. 4 is a graph showing the reflectivity vs. wavelength of pyrolytic ITO grids with various periodicity, as well as the intensity vs. wavelength of solar radiation. As the graph clearly shows, the grid structures are substantially more transparent to both visible and near-infrared solar radiation, as compared to a monolithic ITO film.

Figure 5:
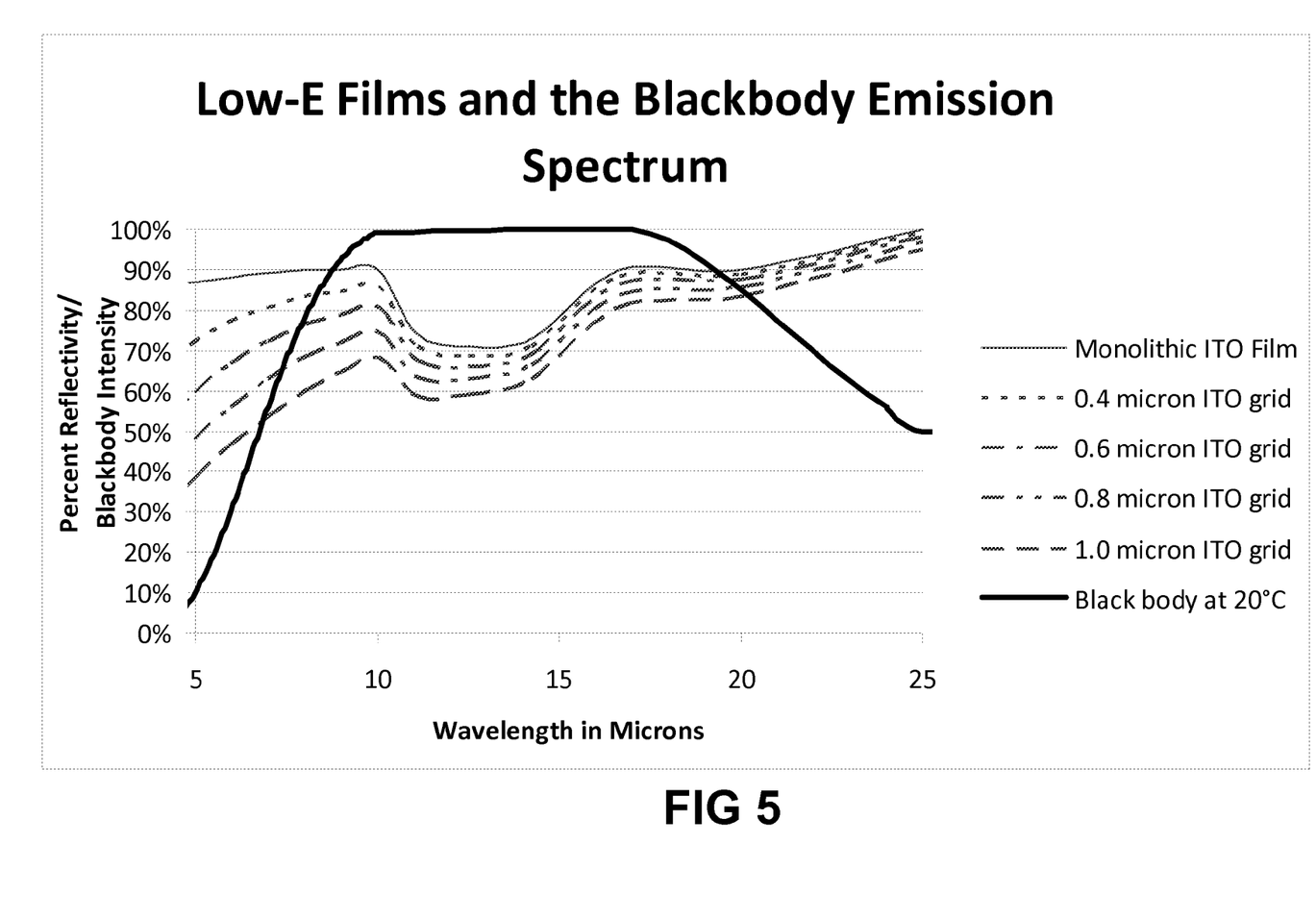
FIG. 5 is a graph showing the reflectivity vs. wavelength of pyrolytic ITO low-E grids with various periodicity, as well as the intensity vs. wavelength of the blackbody radiation emitted by room-temperature objects.

FIG. 5 is a graph showing the reflectivity vs. wavelength of pyrolytic ITO grids with various periodicity, as well as the intensity vs. wavelength of the blackbody radiation emitted by room-temperature objects. As the graph clearly shows, the reflectivity to infrared light in the blackbody wavelengths (roughly equal to one minus the emissivity) changes by at most a few percent as the grid size increases. Thus, the emissivity "penalty" is smaller than the transmissivity gain, meaning that when these microstructured coatings are incorporated into window glass, the windows will perform better in cold, sunny weather, as measured in BTUs of heating consumed or dollars expended.

The spectra of other pyrolytic, transparent, conductive, low-emissivity coatings may vary in detail from the graph shown here, but will be essentially the same in gross form and function, and will be similar in their general performance characteristics. It should also be noted that highly transparent low-E coatings are an excellent complement to thermochromic or thermoreflective window filters, as they separate the low-E function from the adjustment of SHGC, thus increasing the range of transmissivities available to such thermochromic or thermoreflective filters.

Figure 6:
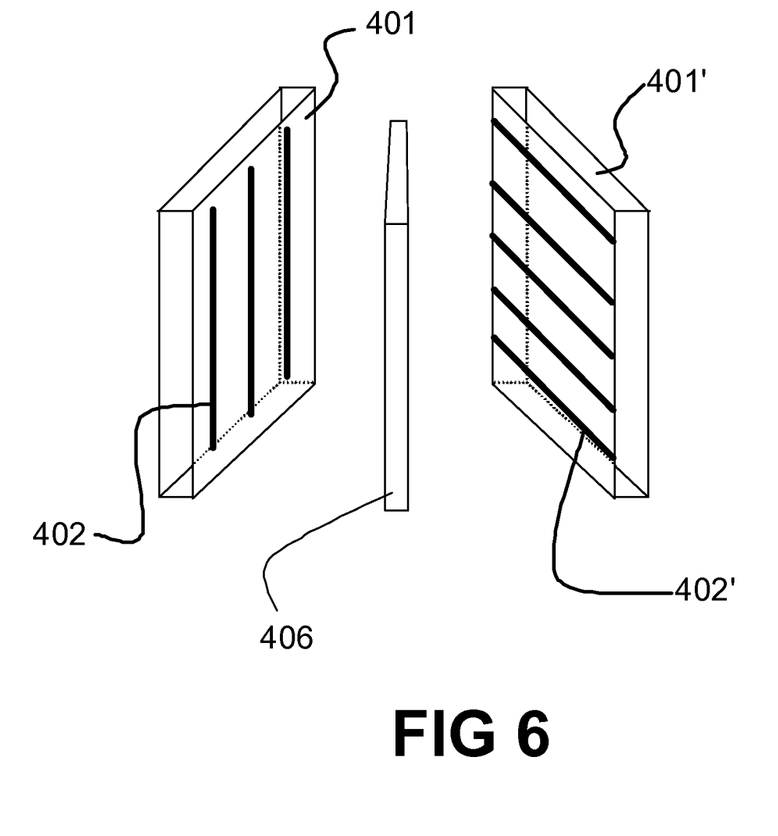
FIG. 6 is an exploded view of an implementation of a double-paned window in which two low-E wire gratings of opposite polarity have been placed on the facing surfaces of the windows.

FIG. 6 shows an exploded view of another embodiment of the present invention in which two windowpanes 401 and 401' are covered with wire grids 402 and 402' on their facing surfaces. Because the blackbody radiation emitted by a grating is inherently polarized, it is possible to place two wire grating polarizers of opposite polarity on the two facing surfaces of a double-paned window, such that the light emitted by one polarizer is strongly reflected by the other, and vice-versa. This is another way to drive a window's effective emissivity very close to zero. However, if the polarizers are also designed to polarize in the range of visible light, these crossed polarizers will result in a highly reflective window that transmits very little light.

The utility of this design as an ordinary architectural window—e.g., as a solid, transparent, non-diffusive wall element through which objects and scenery can be viewed by human beings—is maximized if the spacing of the wire grating is adjusted to polarize (and thus reflect) blackbody radiation while being highly transmissive to visible light, as shown in FIG. 3.

Alternatively, if the spacing of the wire gratings is such that visible light is strongly polarized when passing through them, then the window will appear almost completely reflective in the visible spectrum, unless an optional depolarizer 406 is located somewhere between the two polarizers. The purpose of the depolarizer 406 is to rotate the polarization vector of the visible and near-infrared light passing through it by a set amount (usually 90 degrees), such that the polarized visible light emitted from wire grating 401 is transmitted, rather than reflected, by wire grating 401', and vice-versa.

In one implementation, the depolarizer 406 is selected such that it rotates the polarity of photons within the solar spectrum, for example, between wavelength 0.25-2.5 microns, but has no effect on the polarity of blackbody photons from 5-20 microns. Alternately, if the depolarizer material is opaque to blackbody radiation, then it will tend to absorb and re-radiate blackbody photons, effectively randomizing their polarity. In this case, each wire grating will receive blackbody photons at all polarities, and each one will reflect/attenuate this blackbody radiation by roughly 55%, so that the effective emissivity of the total device is approximately 20%—much less than the 80-90% emissivity of ordinary glass.

The utility of such a device as a low-emissivity window is maximized if the depolarizer 406 is simultaneously transparent to visible light, near infrared light, and blackbody radiation. This can be accomplished if the depolarizer 406 is thinner than the extinction distance of a blackbody photon, or if portions of the depolarizer thicker than this (e.g., structural or substrate materials) are made from materials that are transparent to wavelengths of light in both the solar spectrum and the blackbody spectrum. In this case, diamond is a preferred material, being structurally strong, insoluble in water, and transparent from a range of 0.25-30.0 microns. Other materials, including sodium chloride, are transparent over similar ranges but are soluble in water vapor, which necessitates very thorough desiccation and encapsulation. In either case, a blackbody-transparent depolarizer will neither depolarize nor absorb/re-radiate the blackbody photons, so that once again, the blackbody radiation emitted by one wire grating will be almost completely reflected by the other, such that the effective emissivity of the total device is less than 5%, while its transmissivity to visible and NIR light may (depending on the wire spacing) be approximately equal to the transmissivity of the window material itself.

Twisted nematic liquid crystal cells are commonly employed as depolarizers, with the advantage that their polarization characteristics can be switched on and off. The wire grid polarizers and other wire gratings disclosed herein make effective alignment layers for nematic and twisted nematic liquid crystal cells, thus reducing the total number of components required for a working low-E window device. The use of wire grids and gratings as alignment layers is considered an embodiment of the present invention. Thus, it is possible to use wire gratings as polarizers, alignment layers, and low-emissivity surfaces all at the same time. In all other respects, the design, fabrication, and use of liquid crystal cells and other depolarizers is well known.

While several exemplary embodiments are depicted and described herein, it should be understood that the present invention is not limited to these particular configurations. Optional components such as antireflective coatings or films may be added or moved to suit the needs of a particular application or a particular manufacturing method, and degraded forms of some embodiments can be produced by deleting, combining, or substituting certain components. For example, a wire grid could be replaced with a pseudo-random scattering of nanoscale metal rods, rings, squares or other shapes. This arrangement would be less effective but potentially much cheaper to fabricate.

Although the materials and structures of various embodiments of the present invention may be rigid, there is no requirement for rigidity in order for the low E-film to perform the functions described herein. Furthermore, while the various components in embodiments of the invention are shown and described as being attached or in direct physical contact, the other embodiments of the invention will also function if the components are merely adjacent but physically separate. Thus, while the gridded low-E films can be embodied as a solid object (e.g., a window, glass block, spandrel, or movable panel) or a group of solid objects (e.g., a filtered stage light or a set of components affixed to an optical workbench), they can also be embodied as flexible objects such as, for example, a tent material, a blanket, a curtain, or an appliqué film which can be applied to the surface of glass windows, spandrels, glass block, and other building materials.

A wide variety of alternative materials can be used to manufacture a gridded low-E window device, including metals, ceramics, glasses, nanostructured and microstructured photonic materials, and even ices, liquids, and vapors. The device may include features designed to enhance its thermal insulation properties including but not limited to air gaps, vacuum gaps, foams, beads, fiber pads, or aerogels. It may be thick and rigid enough to serve as a structural component of vehicles or building walls. It may be wrapped around or formed upon complex surfaces. It may be aesthetically enhanced with color, or it may be camouflaged to resemble more conventional building materials.

The exact arrangement of the various layers can be different than is depicted here and, depending on the materials and wavelengths selected, different layers can be combined as single layers, objects, devices, or materials, without altering the essential structure and function of the invention. Although the description above contains many specificities, these should not be construed as limiting the scope of the invention but rather construed as merely providing illustrations of certain exemplary embodiments of it. There are various possibilities for making the device of different materials, and in different configurations.

In addition, the device could incorporate one or more additional polarizers, whether reflective or absorptive, and whether parallel or rotated at some angle to one another and to the original two polarizers, in order to modify the polarization state of light of various wavelengths at various positions within the device. In addition, multiple wire grids of various line spacing can be employed in order to adjust the exact reflectivity, transmissivity, and apparent emissivity to specific wavelengths at various positions within the device. Also, liquid crystal depolarizer can employ a wide variety of different combinations of nematic, twisted nematic, smectic, solid/crystalline, and other physical/molecular states, with or without electric fields, textured surfaces, internal guide wires, or other means to reorient the component molecules. Through the use of lenses, prismatic films, or non-parallel orientation of reflective components, reflections from the device can be sent in any direction, or can be diffused to limit the blinding "second sun" effect that sometimes occurs near large, mirrored surfaces such as buildings and vehicles. Such embodiments are considered part of the present invention.

Numerous other variations exist which do not affect the core principles of the operation of the invention. For example, any or all of the layers could be composed of doped, nanostructured, or microstructured materials including, but not limited to, multilayered polymer optical films and custom photonic crystals. One or more band reflectors such as a distributed Bragg reflector (DBR) or Rugate filter could be added to adjust the reflectivity or transmissivity of the device at specific wavelengths. Colored filters of any sort, whether reflective or absorptive, could be added for aesthetic reasons. One or more layers could be non-planar in shape (e.g., parabolic), or other shaped reflectors or similar devices could be incorporated, to help concentrate or deflect incoming light from a variety of angles, without altering the fundamental properties of the device as a low-emissivity enhancement for windows.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. All directional references e.g., proximal, distal, upper, lower, inner, outer, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Changes in detail or structure may be made without departing from the basic elements of the invention as defined in the following claims.

What is claimed is:

1. A device for reducing an emissivity of a window to long-wavelength infrared light comprising
a film of conductive material formed in a pattern as an arrangement of thin conductive material elements and void areas, wherein
the thin conductive material elements are spaced apart a distance such that the conductive material is highly reflective to long-wavelength infrared light and highly transmissive to visible and near-infrared light, and
energy efficiency and an effective insulation value of the window are increased, an effective thermal conductivity of the window is reduced, and transmissivity to visible and near-infrared radiation is maximized.

2. The device of claim 1, wherein the pattern comprises a grid.

3. The device of claim 1, wherein the pattern comprises a grating.

4. The device of claim 3, wherein the grating is further configured to function as a polarizer.

5. The device of claim 3, wherein the grating is further configured to function as a liquid crystal alignment layer.

6. The device of claim 1, wherein the film comprises a coating on a surface of a pane of glass in the window.

7. The device of claim 1, wherein the thin conductive material elements are 1 nanometer or greater in width.

8. The device of claim 1, wherein the distance between the thin conductive material elements is less than about 20 microns and greater than about 0.1 microns.

9. The device of claim 1, wherein the conductive material comprises a metal or metal oxide wire mesh.

10. The device of claim 1, wherein the thin conductive material segments comprise pseudo-randomly scattered wire segments.

11. The device of claim 1, wherein
the thin conductive material elements further comprise strips of conducting oxides; and
the pattern comprises an arrangement of the strips in alternating layers to form a dielectric mirror.

12. The device of claim 1, wherein the distance between the thin material elements is nonuniform.

13. The device of claim 1 further comprising a layer of dielectric material overcoating the conductive material, wherein the thin layer of dielectric material is transparent to each of visible, infrared, and long-wavelength infrared (blackbody) radiation.

14. The device of claim 1 further comprising
a thin layer of dielectric material overcoating the conductive material, wherein
the dielectric material is normally opaque to long-wavelength infrared (blackbody) radiation; and
a thickness of the thin layer is significantly less than an extinction distance of the long-wavelength infrared (blackbody) radiation in the dielectric material.

15. The device of claim 3 further comprising
a second film of the conductive material, wherein
the pattern of the second film comprises a second grating; and
the two gratings are perpendicularly aligned.

16. The device of claim 15 further comprising
a depolarizer positioned between the two films of the conductive material, wherein
the two gratings polarize visible, near-infrared, and long-wavelength infrared (blackbody) radiation, and
the depolarizer rotates a polarization vector of the visible and near-infrared radiation without affecting the polarization of the long-wavelength infrared (blackbody) radiation.

17. A low emissivity window comprising
a pane of glass; and
a film of a conductive material formed in a pattern as an arrangement of thin conductive material elements and void areas, wherein
the thin conductive material elements are spaced apart a distance such that the conductive material is highly reflective to long-wavelength infrared light and highly transmissive to visible and near-infrared light, and
energy efficiency and an effective insulation value of the window are increased, an effective thermal conductivity of the window is reduced, and transmissivity to visible and near-infrared radiation is maximized.

18. The low emissivity window of claim 17, wherein the pattern comprises a grid.

19. The low emissivity window of claim 17, wherein the pattern comprises a grating.

20. The low emissivity window of claim 19, wherein the grating is further configured to function as a polarizer.

21. The low emissivity window of claim 19, wherein the grating is further configured to function as a liquid crystal alignment layer.

22. The low emissivity window of claim 17, wherein the film comprises a coating on a surface of the pane of glass in the window.

23. The low emissivity window of claim 17, wherein the thin conductive material elements are 1 nanometer or greater in width.

24. The low emissivity window of claim 17, wherein the distance between the thin conductive material elements is less than about 20 microns and greater than about 0.1 microns.

25. The low emissivity window of claim 17, wherein the conductive material comprises a metal or metal oxide wire mesh.

26. The low emissivity window of claim 17, wherein the thin conductive material elements comprise pseudo-randomly scattered wire segments.

27. The low emissivity window of claim 17, wherein
the thin conductive material elements further comprise strips of conducting oxides; and
the pattern comprises an arrangement of the strips in alternating layers to form a dielectric mirror.

28. The low emissivity window of claim 17, wherein the distance between the thin conductive material elements is nonuniform.

29. The low emissivity window of claim 1 further comprising a layer of dielectric material overcoating the conductive material, wherein the thin layer of dielectric material is transparent to each of visible, infrared, and long-wavelength infrared (blackbody) radiation.

30. The low emissivity window of claim 17 further comprising
a thin layer of dielectric material overcoating the conductive material, wherein
the dielectric material is normally opaque to long-wavelength infrared (blackbody) radiation; and
a thickness of the thin layer is significantly less than an extinction distance of the long-wavelength infrared (blackbody) radiation in the dielectric material.

31. The low emissivity window of claim 19 further comprising
a second film of the conductive material, wherein
the pattern of the second film comprises a second grating; and
the two gratings are perpendicularly aligned.

32. The low emissivity window of claim 31 further comprising
a depolarizer positioned between the two films of the conductive material, wherein
the two gratings polarize visible, near-infrared, and long-wavelength infrared (blackbody) radiation, and
the depolarizer rotates a polarization vector of the visible and near-infrared radiation without affecting the polarization of the long-wavelength infrared (blackbody) radiation.

33. A low emissivity window comprising
a pane of glass; and
a grid of nanoscale conductive wires supported on the pane of glass, wherein
the nanoscale conductive wires are spaced apart a distance such that the grid is highly reflective to long-wavelength infrared light and highly transmissive to visible and near-infrared light, and
enemy efficiency and an effective insulation value of the window are increased, an effective thermal conductivity of the window is reduced, and transmissivity of the window to visible and near-infrared radiation is maximized.

34. The low emissivity window of claim 33 further comprising
a thin layer of dielectric material overcoating the nanoscale conductive wires, wherein
the dielectric material is normally opaque to long-wavelength infrared (blackbody) radiation; and
a thickness of the thin layer is significantly less than an extinction distance of the long-wavelength infrared (blackbody) radiation in the dielectric material.

\* \* \* \* \*